US011373665B2

(12) United States Patent
Wurtz et al.

(10) Patent No.: US 11,373,665 B2
(45) Date of Patent: Jun. 28, 2022

(54) VOICE ISOLATION SYSTEM (71) Applicant: AVNERA CORPORATION, Hillsboro, OR (US)

(72) Inventors: David Wurtz, Portland, OR (US); Michael Wurtz, Lake Oswego, OR (US); Amit Kumar, Portland, OR (US); Colin Doolittle, Portland, OR (US)

(73) Assignee: AVNERA CORPORATION, Hillsboro, OR (US)

( * ) Notice: Subject to any disclaimer, the term of this patent is extended or adjusted under 35 U.S.C. 154(b) by 55 days.

(21) Appl. No.: 16/242,424

(22) Filed: Jan. 8, 2019

(65) Prior Publication Data
US 2019/0214036 A1 Jul. 11, 2019

Related U.S. Application Data (60) Provisional application No. 62/614,995, filed on Jan. 8, 2018.

(51) Int. Cl.
*G10L 21/00* (2013.01)
*G10L 21/02* (2013.01)
(Continued)

(52) U.S. Cl.
CPC .... *G10L 21/0216* (2013.01); *G10K 11/17827* (2018.01); *G10K 11/17833* (2018.01);
(Continued)

(58) Field of Classification Search
CPC . G10L 2021/02082; G10L 2021/02166; G10L 21/0208; G10L 15/20;
(Continued)

(56) References Cited

U.S. PATENT DOCUMENTS

| 9,578,415 B1* | 2/2017 | Zhou | H04R 3/002 |
| 2010/0046767 A1* | 2/2010 | Bayley | G01H 3/14 |
| | | | 381/59 |

(Continued)

FOREIGN PATENT DOCUMENTS

| EP | 1729492 A2 | 12/2006 | |
| WO | WO-2010147346 A2 * | 12/2010 | ........... H04B 7/0417 |
| WO | 2018219582 A1 | 12/2018 | |

OTHER PUBLICATIONS

Cohen, Israel "Noise Spectrum Estimation in Adverse Environments: Improved Minima Controlled Recursive Averaging," IEEE Transactions on Speech and Audio Processing, 11:5, Sep. 2003 pp. 466-475.

(Continued)

Primary Examiner — Michael Ortiz-Sanchez
(74) Attorney, Agent, or Firm — Lando & Anastasi, LLP (57) ABSTRACT

The disclosure includes a voice isolation system comprising an acoustic echo-cancelation subsystem configured to receive a plurality of input signals, subtract an interference component from the input signals, and provide a plurality of output signals. The system also includes an adaptive beamformer subsystem configured to receive the plurality of output signals from the acoustic echo-cancelation subsystem and compute a signal-to-noise ratio enhanced signal based on the received output signals. The system also includes a residual noise suppressor subsystem configured to attenuate at least one portion of the SNR enhanced signal received from the adaptive beamformer subsystem based on the at least one portion having an SNR below a predetermined SNR threshold. The system also includes an automatic gain control subsystem configured to process a signal outputted from the residual noise suppressor subsystem and transmit a resulting signal as an output signal.

19 Claims, 5 Drawing Sheets

(51) Int. Cl.

| | | |
|---|---|---|
| *G10L 21/0216* | (2013.01) | |
| *H04M 9/08* | (2006.01) | |
| *G10K 11/178* | (2006.01) | |
| *G10L 21/0208* | (2013.01) | |
| *G10L 15/20* | (2006.01) | |
| *G10L 25/78* | (2013.01) | |
| *H04R 1/10* | (2006.01) | |
| *H04R 5/033* | (2006.01) | |
| *H04R 3/00* | (2006.01) | |

(52) U.S. Cl.
CPC .......... *G10L 15/20* (2013.01); *G10L 21/0208* (2013.01); *G10L 25/78* (2013.01); *H04M 9/082* (2013.01); G10K 2210/108 (2013.01); G10L 2021/02082 (2013.01); *G10L 2021/02165* (2013.01); G10L 2021/02166 (2013.01); *H04R 1/1083* (2013.01); *H04R 3/005* (2013.01); *H04R 5/033* (2013.01)

(58) Field of Classification Search
CPC ....... G10L 2021/02165; G10L 21/0216; G10L 25/78; G10L 21/0232; G10L 21/0272; G10L 21/0316; G10L 25/93; G10L 2021/02085; G10L 21/0264; G10L 25/21; G10L 15/02; G10L 21/0205; G10L 21/034; G10L 25/60; H04R 3/02; H04R 1/1083; H04R 2420/07; H04R 3/005; H04R 5/033; H04M 9/082; G10K 2210/505; G10K 11/002; G10K 11/16; G10K 11/17827; G10K 11/17833; G10K 2210/108

See application file for complete search history.

(56) References Cited

U.S. PATENT DOCUMENTS

| | | | | |
|---|---|---|---|---|
| 2011/0007907 A1* | 1/2011 | Park | .................. | G10K 11/17881 381/71.8 |
| 2011/0288860 A1* | 11/2011 | Schevciw | ............... | G10L 25/78 704/233 |
| 2011/0293103 A1* | 12/2011 | Park | ..................... | G10K 11/178 381/57 |
| 2012/0014532 A1* | 1/2012 | Kimura | ................ | H04R 1/1083 381/71.6 |
| 2013/0083934 A1* | 4/2013 | Hgren | .................. | H04M 9/082 381/58 |
| 2013/0230086 A1* | 9/2013 | Sorensen | ............... | H04B 7/015 375/227 |
| 2013/0282373 A1* | 10/2013 | Visser | .................. | G10L 21/0316 704/233 |
| 2014/0314246 A1* | 10/2014 | Hellman | .......... | G10K 11/17885 381/71.11 |
| 2015/0003625 A1* | 1/2015 | Uhle | ...................... | H04R 3/002 381/71.6 |
| 2015/0371657 A1* | 12/2015 | Gao | ..................... | G10K 11/341 381/66 |
| 2015/0371659 A1* | 12/2015 | Gao | ..................... | H04M 9/082 704/226 |
| 2016/0027447 A1* | 1/2016 | Dickins | ............... | H04L 12/1813 704/228 |
| 2016/0329042 A1* | 11/2016 | Christoph | ........ | G10K 11/17854 |
| 2017/0178662 A1* | 6/2017 | Ayrapetian | ...... | G10L 21/0216 |
| 2017/0263267 A1* | 9/2017 | Dusan | .................. | H04R 1/1016 |
| 2018/0014112 A1* | 1/2018 | Iyer | ................... | G10L 21/0264 |
| 2018/0098146 A1* | 4/2018 | Lin | ..................... | H04R 1/1083 |
| 2018/0115839 A1* | 4/2018 | Eichfeld | ................ | H04R 5/027 |
| 2018/0190260 A1* | 7/2018 | Christoph | ........ | G10K 11/17861 |
| 2018/0199138 A1* | 7/2018 | Dusan | .................. | H04R 5/0335 |
| 2019/0058529 A1* | 2/2019 | Zheng | ................ | H04L 25/03171 |

OTHER PUBLICATIONS

International Search Report and Written Opinion, PCT/US2019/012767, dated Apr. 25, 2019, 17 pp.

Buck, M. et al., "Chapter 8: Acoustic Array Processing for Speech Enhancement," Handbook on Array Processing and Sensor Networks, Wiley—IEEE Press, Hoboken, NJ, pp. 231-268, Jul. 24, 2009.

* cited by examiner

VOICE ISOLATION SYSTEM

CROSS-REFERENCE TO RELATED APPLICATION

This application is a non-provisional of and claims benefit from U.S. Provisional Patent Application No. 62/614,995, which is entitled VOICE ISOLATION SYSTEM and was filed on Jan. 8, 2018, the content of which is incorporated herein by reference in its entirety.

TECHNICAL FIELD

Embodiments of the disclosed technology are generally directed to enhancements of a user speech signal as measured by a communication headset such as, for example, a noise-canceling earbud.

BACKGROUND

People often participate in voice calls in noisy environments. Some headsets have active noise cancelation capability but, while this may reduce the perceived noise level for the user, it does not reduce the noise level for the far-end listener(s) on the voice call. Thus, the far-end listener(s) do not receive the same benefit as the user with regard to the active noise cancelation capability.

Embodiments described in this disclosure address these and other limitations of the prior art.

BRIEF DESCRIPTION OF THE DRAWINGS

Aspects, features and advantages of embodiments of the present disclosure will become apparent from the following description of embodiments in reference to the appended drawings in which.

DETAILED DESCRIPTION

Embodiments of the disclosed technology generally enhance a user's speech signal as measured by a communication headset. To do so, embodiments of the disclosed technology generally take advantage of an asymmetry in speech coupling that is characteristic of some acoustic platforms such as noise canceling earbuds, for example. This asymmetry typically arises due to one of the microphones (e.g., the feedback microphone in a noise-canceling system) being partially coupled to the user's speech through bone conduction, while another one of the microphones (e.g., the feedforward microphone in the noise-canceling system) may be predominantly coupled to the user's speech acoustically. The latter microphone may also be acoustically coupled to the ambient environment. This asymmetry in speech coupling is a mechanism that may be exploited by embodiments of the disclosed technology to enhance the user's speech signal.

Embodiments of the disclosed technology generally include a voice isolation system in a communication headset having a headphone speaker and a feedback microphone. The headset may also include a feedforward microphone and/or be coupled to one or more ambient microphones that are separate from the headset.

The voice isolation system may be configured to generate a first covariance signal between the feedback microphone and an audio signal from the headphone speaker as well as a second covariance signal between the ambient/feedforward microphone and the audio signal from the headphone speaker.

Filters may be applied to the microphones based on estimates of the signal, interference, and noise spectra on each microphone, which, in turn, may be estimated from an analysis of the first and second covariance signals. An SNR enhanced signal may be provided as an output from a sum of the filtered microphone measurements.

Figure 1:
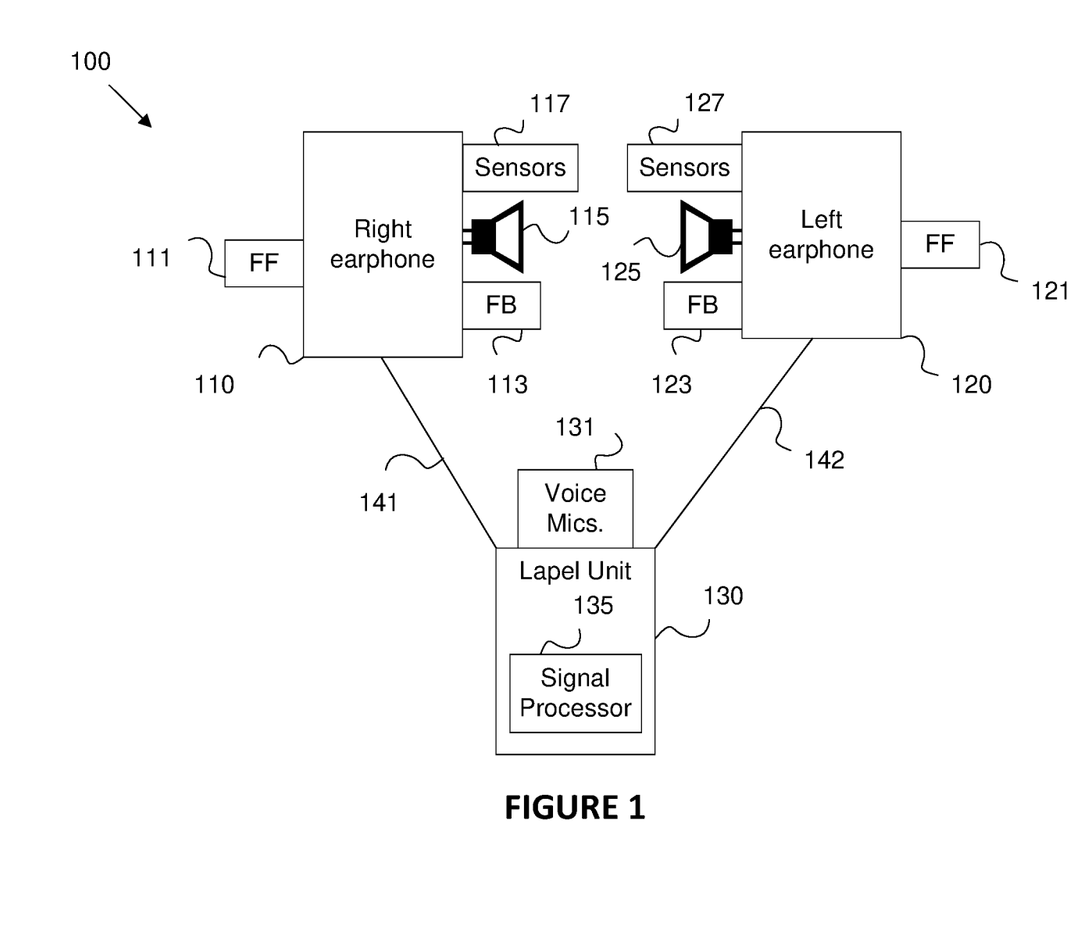
FIG. 1 is a schematic diagram of an example headset in accordance with certain implementations of the disclosed technology.

FIG. 1 is a schematic diagram of an example headset 100 in accordance with certain implementations of the disclosed technology. In the example, the headset 100 includes a right earphone 110, a left earphone 120, and a lapel unit 130. However, it should be noted that certain mechanisms disclosed herein may be employed in an example headset including a single earphone and/or an example without a lapel unit 130. The headset 100 may be configured to perform local ANC, for example when the lapel unit 130 is coupled to a device that plays music files. The headset 100 may also perform unlink noise cancellation, for example when the lapel unit 130 is coupled to a device capable of making phone calls (e.g. a smart phone).

The right earphone 110 may be a device capable of playing audio data, such as music and/or voice from a remote caller. The right earphone 110 may be crafted as a headphone that can be positioned adjacent to a user's ear canal (e.g. on ear). The right earphone 110 may also be crafted as an earbud, in which case at least some portion of the right earphone 110 may be positioned inside a user's ear canal (e.g. in-ear).

The right earphone 110 generally includes at least a speaker 115 and a feedforward (FF) microphone 111. The right earphone 110 may also include a feedback (FB) microphone 113 and/or one or more sensors 117. The speaker 115 may be any transducer capable of converting voice signals, audio signals, and/or ANC signals into soundwaves for communication toward a user's ear canal, for example.

The FB microphone 113 and the speaker 115 may be positioned together on a proximate wall of the right earphone 110. Depending on the example, the FB microphone 113 and speaker 115 may be positioned inside a user's ear canal when engaged (e.g. for an earbud) or positioned adjacent to the user's ear canal in an acoustically sealed chamber when engaged (e.g. for an earphone). The FB microphone 113 may be configured to record soundwaves entering the user's ear canal. Hence, the FB microphone 113 generally detects ambient noise perceived by the user, audio signals, remote voice signals, the ANC signal, and/or the user's voice which may be referred to as a sideband signal.

As the FB microphone 113 detects both the ambient noise perceived by the user and any portion of the ANC signal that is not destroyed due to destructive interference, the FB microphone 113 signal may contain feedback information. The FB microphone 113 signal can be used to adjust the ANC signal in order to adapt to changing conditions and to better cancel the ambient noise.

In the example, the FF microphone 111 is positioned on a distal wall of the earphone and maintained outside of the user's ear canal and/or the acoustically sealed chamber, depending on the example. The FF microphone 111 is acoustically isolated from the ANC signal and generally isolated from remote voice signals and audio signals when the right ear phone is engaged. The FF microphone 111 records ambient noise as user voice/sideband. Accordingly, the FF microphone 111 signal can be used to generate an ANC signal.

The FF microphone 111 signal is better able to adapt to high frequency noises than the FB microphone 113 signal. However, the FF microphone 111 cannot detect the results of the ANC signal, and hence cannot adapt to non-ideal situations, such as a poor acoustic seal between the right earphone 110 and the ear. As such, the FF microphone 111 and the FB microphone 113 can be used in conjunction to create an effective ANC signal.

The right earphone 110 may also include sensing components to support off ear detection (OED). In some examples, the FB microphone 113 and the FF microphone 111 are employed as sensing components. In such a case, the FB microphone 113 signal and the FF microphone 111 signal are different when the right earphone 110 is engaged due to the acoustic isolation between the earphones. When the FB microphone 113 signal and the FF microphone 111 signal are similar, the headset 100 can determine that the corresponding earphone 110 is not engaged.

In other examples, sensors 117 can be employed as sensing components to support OED. For example, the sensors 117 may include an optical sensor that indicates low light levels when the right earphone 110 is engaged and higher light levels when the right earphone 110 is not engaged. In other examples, the sensors 117 may employ pressure and/or electrical/magnetic currents and/or fields to determine when the right earphone 110 is engaged or disengaged. In other words, the sensors 117 may include capacitive sensors, infrared sensors, visual light optical sensors, etc.

The left earphone 120 is substantially similar to the right earphone 110, but configured to engage with a user's left ear. Specifically, the left earphone 120 may include sensors 127, speaker 125, a FB microphone 123, and a FF microphone 121, which may be substantially similar to the sensors 117, the speaker 115, the FB microphone 113, and the FF microphone 121. The left earphone 120 may also operate in substantially the same manner as the right earphone 110 as discussed above.

The left earphone 120 and the right earphone 110 may be coupled to a lapel unit 130 via a left cable 142 and a right cable 141, respectively. The left cable 142 and the right cable 141 are any cables capable of conducting audio signals, remote voice signals, and/or ANC signals from the lapel unit to the left earphone 120 and the right earphone 110, respectively.

The lapel unit 130 is an optional component is certain implementations. The lapel unit 130 generally includes one or more voice microphones 131 and a signal processor 135. The voice microphones 131 may be any microphone configured to record a user's voice signal for uplink voice transmission, for example during a phone call. In some examples, multiple microphones may be employed to support beamforming techniques. The term beamforming as used herein generally refers to a spatial signal processing technique that employs multiple receivers to record the same wave from multiple physical locations. A weighted average of the recording may then be used as the recorded signal.

By applying different weights to different microphones, the voice microphones 131 can be virtually pointed in a particular direction for increased sound quality and/or to filter out ambient noise. It should be noted that the voice microphones 131 may also be positioned in other locations in some examples. For example, the voice microphones 131 may hang from cables 141 or 142 below the right earphone 110 or the left earphone 120, respectively. The beamforming techniques disclosed herein are equally applicable to such a scenario with minor geometric modifications.

In the example, the signal processor 135 is coupled to the left earphone 120 and right earphone 110, via the cables 142 and 141, and to the voice microphones 131. The signal processor 135 is any processor capable of generating an ANC signal, performing digital and/or analog signal processing functions, and/or controlling the operation of the headset 100. The signal processor 135 may include and/or be connected to memory, and hence may be programmed for particular functionality.

The signal processor 135 may also be configured to convert analog signals into a digital domain for processing and/or convert digital signals back to an analog domain for playback by the speakers 115 and 125. The signal processor 135 may be implemented as a general purpose processor, and application specific integrated circuit (ASIC), a digital signal processor (DSP), a field programmable gate array (FPGA), or combinations thereof.

Figure 2:
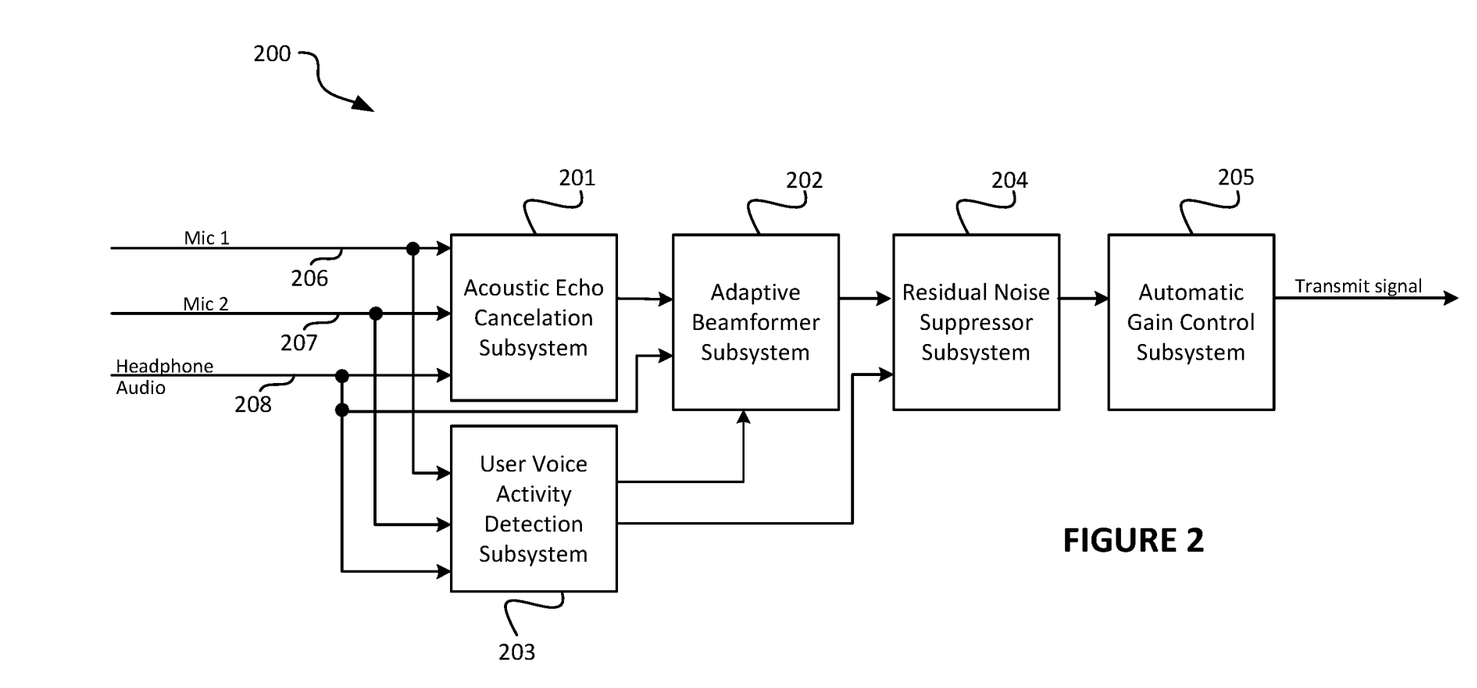
FIG. 2 illustrates an example of a functional block diagram of a voice isolation system in accordance with certain implementations of the disclosed technology.

FIG. 2 illustrates an example of a functional block diagram of a voice isolation system 200 in accordance with certain implementations of the disclosed technology. In the example, the voice isolation system 200 includes an acoustic echo-cancelation subsystem 201, an adaptive beamformer subsystem 202, a user voice activity detection subsystem 203, a residual noise suppression subsystem 204, and an automatic gain control subsystem 205. It will be appreciated that any or all of the acoustic echo-cancelation subsystem 201, adaptive beamformer subsystem 202, user voice activity detection subsystem 203, residual noise suppression subsystem 204, and automatic gain control subsystem 205 may be executed by a processor such as the signal processor 135 illustrated by FIG. 1, for example.

In the example, the acoustic echo-cancelation subsystem 201 is configured to receive a first microphone signal 206 (such as a feedforward signal, for example), a second microphone signal 207 (such as a feedback signal, for example), and a headphone audio signal 208. The acoustic echo-cancelation subsystem 201 may be configured to subtract the interference component (e.g., due to the headphone loudspeaker) from the input signals. In certain embodiments, filters may be applied to each microphone that are derived from real-time estimates of the signal, interference, and noise spectra on each microphone.

These signal, interference, and noise spectra may be estimated from an analysis of the covariance between each microphone and additionally the headphone audio signal. This covariance analysis generally takes advantage of the asymmetry in speech coupling between microphones as described above. For example, at certain frequencies, the feedback microphone may have significant speech coupling (e.g., due to bone conduction) and weak acoustic coupling to ambient noise (e.g., due to active noise cancelation), while having significant interference from the headphone loudspeaker. Conversely, the ambient microphone may have substantially equal acoustic coupling to speech and ambient noise but weaker—or even negligible—interference from the headphone loudspeaker.

In the example, the adaptive beamformer subsystem 202 may be configured to compute a signal-to-noise ratio (SNR-) enhanced signal from output signals of the acoustic echo-cancelation subsystem 201, and the user voice activity detection (UVAD) subsystem 203 may be configured to provide control signals to indicate the likely presence or absence of the user's speech. It should be noted that the user voice activity detection subsystem 203 may not be present in every implementation.

Figure 3:
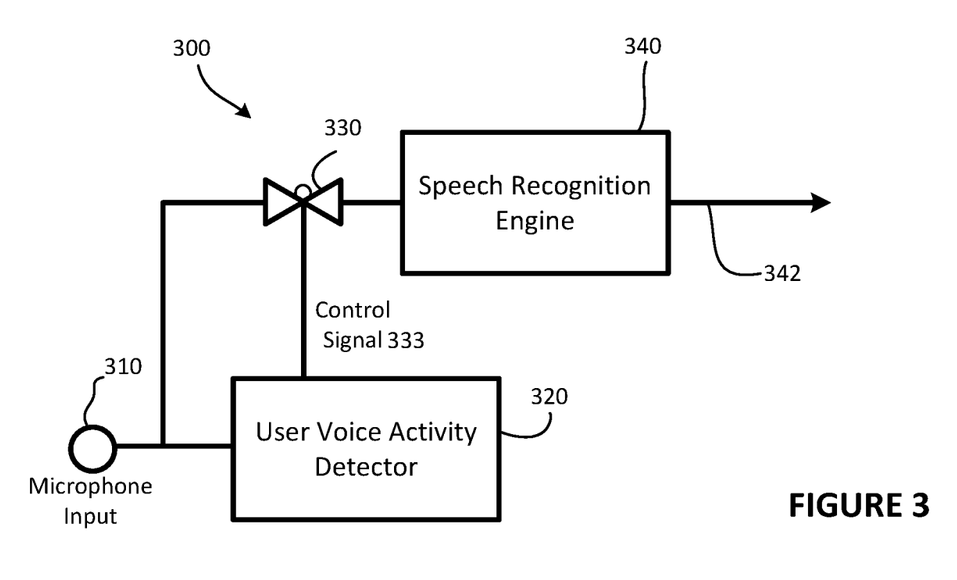
FIG. 3 illustrates a first example of a user voice activity detection subsystem in accordance with certain implementations of the disclosed technology.

FIG. 3 illustrates a first example of a user voice activity detection subsystem 300 in accordance with certain implementations of the disclosed technology. In the example, an input 310 carries an input microphone signal from a microphone that may be a specific user microphone, part of a noise-canceling headphone, or a microphone that is built-in or coupled to a device, for example. Although a single microphone input 310 is illustrated, it will be appreciated that the input 310 may carry input from any number of microphones. Additionally, as used herein, the term microphone generally refers to any apparatus or transducer configured to produce an electrical signal from a physical quantity such as sound or vibration.

In the example, a User Voice Activity Detector (UVAD) 320 is configured to receive the input 310, evaluate the input, and generate a control signal based on the input evaluation. The control signal is generally active when the user's voice is sensed on the input 310, and is generally not active at any other time. More specifically, the UVAD 320 may accurately detect the presence or absence of the user's voice, even when the user's voice is one of multiple voices carried by the microphone input 310. The UVAD 320 may be configured to output a control signal 322, which may be a "1" when the user is actively speaking and a "0" when the user is not actively speaking, for example.

In certain embodiments, the control signal 322 may be used to control a passgate 330 or other control structure that is configured to control whether the input 310 is to be passed to a Speech Recognition Engine (SRE) 340. In operation, if a user is not actively speaking, the UVAD 320 generally generates the proper control signal 322 to block the microphone input 310 from being passed to the SRE 340. In this manner, the SRE 340 may be prevented from generating any false-positive keyword detections when the user is not speaking because the UVAD 320 may prevent the SRE 340 from receiving the microphone input 310 when the user is not speaking. Thus, the SRE 340 may only generate a positive output 342, e.g., the keyword detect, when the user himself or herself has spoken the keyword.

Figure 4:
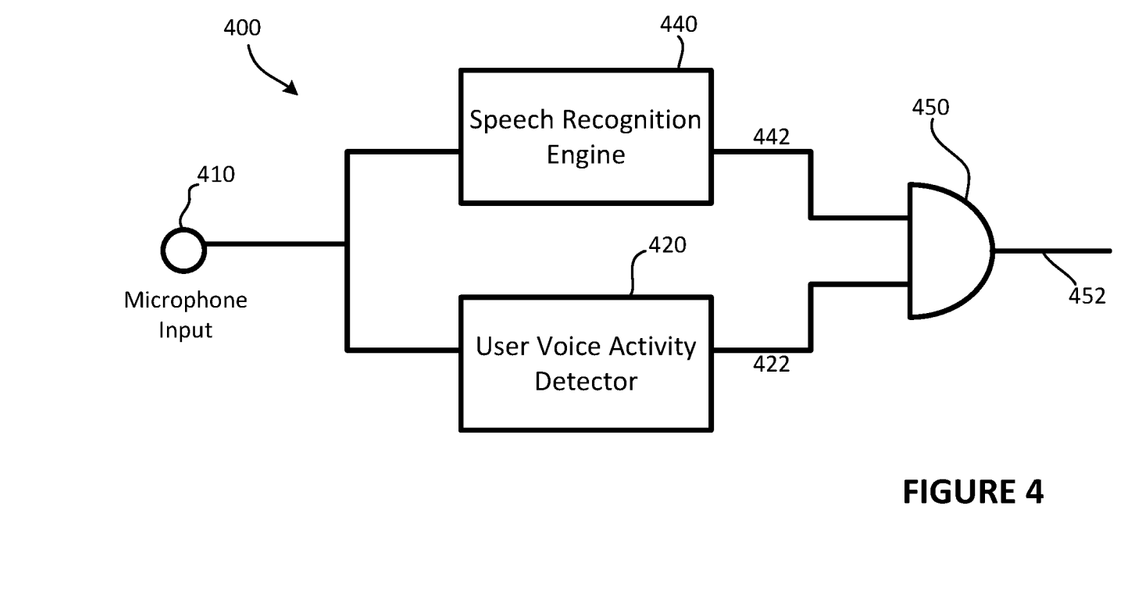
FIG. 4 illustrates a second example of a user voice activity detection subsystem in accordance with certain implementations of the disclosed technology.

FIG. 4 illustrates a second example of a user voice activity detection subsystem 400 in accordance with certain implementations of the disclosed technology. In the example, a microphone input 410 is passed to a UVAD 420. Unlike the subsystem 300 illustrated by FIG. 3, however, the microphone input 410 of subsystem 400 is also passed to an SRE 440 regardless of the output of the UVAD 420. In other words, the SRE 440 of the system 400 is generally constantly processing the microphone input 410. In certain implementations, an AND gate 450—or other functionally similar structure or operation—may be configured to control a final output 452 of the subsystem 400.

In the example, the AND gate 450 only passes an output signal 442 from the SRE 440 when both the SRE 440 detects the keyword and when the UVAD 420 determines that the user is actively speaking, e.g., when both output signals 442 and 422 are "1". Although the output 452 of the system 400 is generally functionally equivalent to the output 342 of the subsystem 300 illustrated by FIG. 3, the subsystem 400 may use more electrical power due to the SRE 440 being continuously active. Therefore, the subsystem 400 may be a preferred solution for low-power applications.

The residual noise suppression subsystem 204 illustrated by FIG. 2 may be configured to attenuate certain portions of the spectrum (e.g., after echo-cancelation) that have poor SNR. The automatic gain control (AGC) subsystem 205 may be configured to process the output of the residual noise suppression subsystem 204. In certain implementations, the AGC subsystem 205 may be tuned to attenuate signals with a root mean square (RMS) envelope below a certain threshold, for example.

Figure 5:
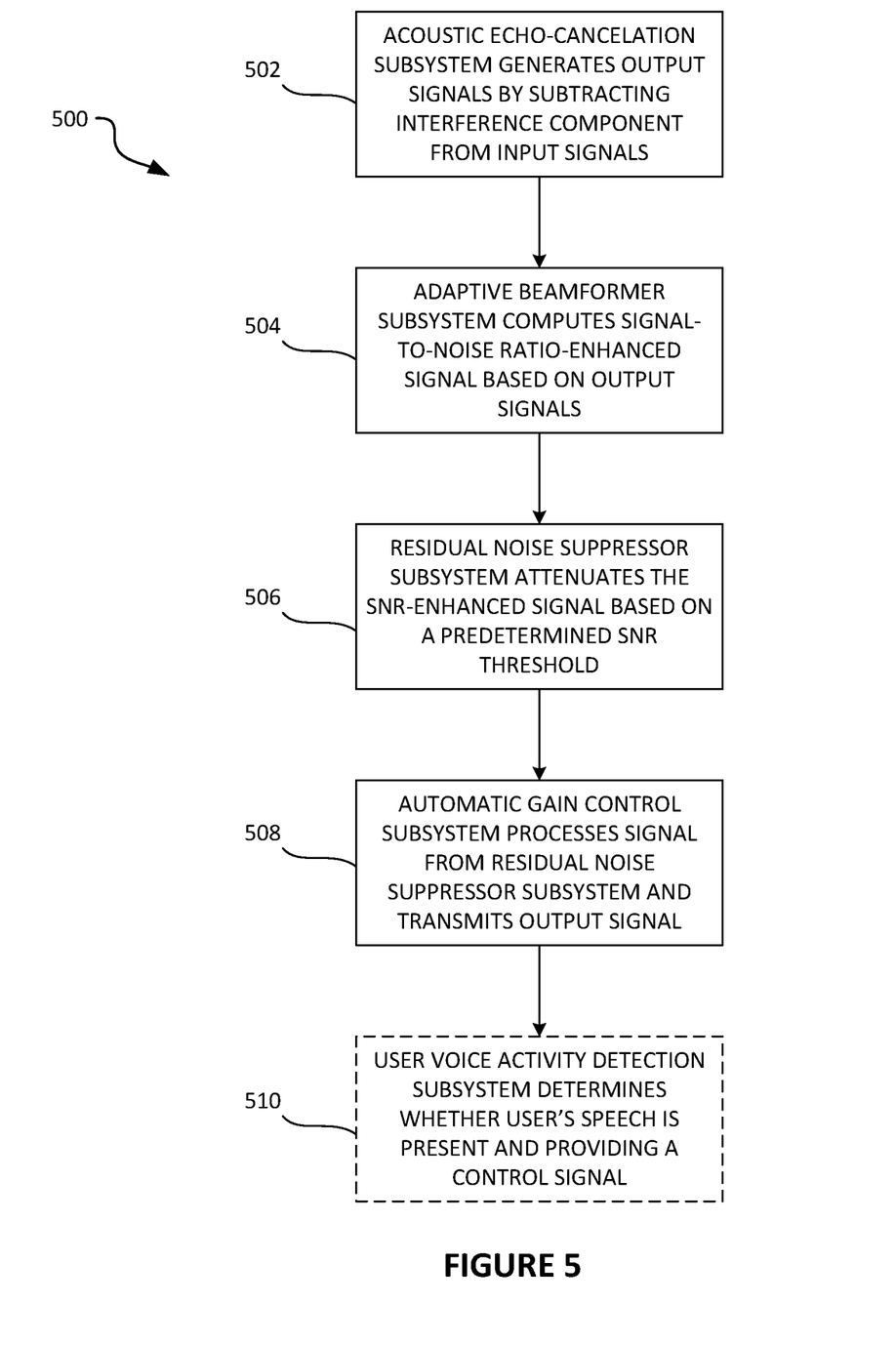
FIG. 5 illustrates an example of a voice isolation method in accordance with certain implementations of the disclosed technology.

FIG. 5 illustrates an example of a voice isolation method 500 in accordance with certain implementations of the disclosed technology.

At 502, an acoustic echo-cancelation subsystem receives a plurality of input signals and generates a plurality of output signals by subtracting an interference component from the input signals. In certain embodiments, the input signals can include any or all of the following: a feedforward signal, a feedback signal, and a headphone audio signal. These signals may be respectively provided by a feedforward microphone, a feedback microphone, and a headphone, for example.

At 504, an adaptive beamformer subsystem computes a signal-to-noise ratio (SNR) enhanced signal based at least in part on a plurality of output signals received from the acoustic echo-cancelation subsystem.

At 506, a residual noise suppressor subsystem attenuates at least one portion of the SNR enhanced signal received from the adaptive beamformer subsystem based on the at least one portion having an SNR below a predetermined SNR threshold.

At 508, an automatic gain control (AGC) subsystem processes a signal outputted from the residual noise suppressor subsystem and transmits a resulting signal as an output signal. The AGC subsystem may process the signal outputted from the residual noise suppressor subsystem by attenuating the signal with a root mean square (RMS) envelope below a predetermined threshold.

In certain implementations, a user voice activity detection (UVAD) subsystem may determine whether a user's speech is present and subsequently provide a control signal based on the determination, as indicated at 510. The UVAD subsystem may provide the output control signal to either or both of the adaptive beamformer subsystem and the residual noise suppressor subsystem.

It should be noted that voice isolation functionality described herein generally needs only a single earbud to function. In implementations that include two earbuds, embodiments of the disclosed technology may use the microphones of both earbuds simultaneously (e.g., thus utilizing more microphones) or such embodiments may use only the earbud having the better performance between the two. Performance quality could be determined by automatic noise canceling (ANC) attenuation or an on-ear detection metric, for example.

In certain alternative implementations, the ambient microphone may not need to be for feedforward ANC. Accordingly, in such implementations, the ambient microphone may be a voice microphone worn on a lapel or attached to a cord, for example.

Certain alternative implementations may include the use of more than two microphones. For example, certain embodiments may use three ambient microphones and one feedback microphone.

Further alternative implementations may include the use of a close-talk mic boom instead of a feedback microphone.

Certain implementations may additionally use Acoustic Echo Cancelation and a noise suppressor. The noise suppressor include input from a User Voice Activity Detector, and the noise-suppressed signal may further be subject to gain control.

Embodiments of the invention may be incorporated into integrated circuits such as sound processing circuits, or other audio circuitry. In turn, the integrated circuits may be used in audio devices such as headphones, mobile phones, portable computing devices, sound bars, audio docks, amplifiers, speakers, etc.

The disclosed aspects may be implemented, in some cases, in hardware, firmware, software, or any combination thereof. The disclosed aspects may also be implemented as instructions carried by or stored on one or more or non-transitory computer-readable media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Additionally, this written description makes reference to particular features. It is to be understood that the disclosure in this specification includes all possible combinations of those particular features. For example, where a particular feature is disclosed in the context of a particular aspect, that feature can also be used, to the extent possible, in the context of other aspects.

Also, when reference is made in this application to a method having two or more defined steps or operations, the defined steps or operations can be carried out in any order or simultaneously, unless the context excludes those possibilities.

EXAMPLES

Illustrative examples of the technologies disclosed herein are provided below. An embodiment of the technologies may include any one or more, and any combination of, the examples described below.

Example 1 includes a voice isolation system comprising: an acoustic echo-cancelation subsystem configured to receive a plurality of input signals, subtract an interference component from the input signals, and provide a plurality of output signals; an adaptive beamformer subsystem configured to receive the plurality of output signals from the acoustic echo-cancelation subsystem and compute a signal-to-noise ratio (SNR) enhanced signal based on the received output signals; a residual noise suppressor subsystem configured to attenuate at least one portion of the SNR enhanced signal received from the adaptive beamformer subsystem based on the at least one portion having an SNR below a predetermined SNR threshold; and an automatic gain control (AGC) subsystem configured to process a signal outputted from the residual noise suppressor subsystem and transmit a resulting signal as an output signal.

Example 2 includes the voice isolation system of Example 1, wherein the plurality of input signals includes a headphone audio signal.

Example 3 includes the voice isolation system of any of Examples 1-2, the system further comprising a headphone configured to provide the headphone audio signal.

Example 4 includes the voice isolation system of any of Examples 1-3, wherein the plurality of input signals includes a feedforward signal and a feedback signal.

Example 5 includes the voice isolation system of Example 4, the system further comprising: a feedforward microphone configured to provide the feedforward signal; and a feedback microphone configured to provide the feedback signal.

Example 6 includes the voice isolation system of Example 5, the system further comprising a filter coupled with each of the microphones, wherein each filter is derived from a real-time estimate of signal, interference, and noise spectra for the corresponding microphone.

Example 7 includes the voice isolation system of any of Examples 1-6, the system further comprising a user voice activity detection (UVAD) subsystem configured to determine whether a user's speech is present and provide a control signal based on the determination.

Example 8 includes the voice isolation system of Example 7, wherein the residual noise suppressor subsystem is further configured to receive the control signal from the UVAD subsystem and attenuate at least one portion of the SNR enhanced signal received from the adaptive beamformer subsystem based at least in part on the control signal.

Example 9 includes the voice isolation system of Example 7, wherein the adaptive beamformer subsystem is further configured to receive the control signal from the UVAD subsystem and compute the SNR-enhanced signal based at least in part on the control signal.

Example 10 includes the voice isolation system of any of Examples 1-9, wherein the AGC subsystem is configured to process the signal outputted from the residual noise suppressor subsystem by attenuating the signal outputted from the residual noise suppressor subsystem with a root mean square (RMS) envelope below a predetermined threshold.

Example 11 includes a method for voice isolation, said method comprising: an acoustic echo-cancelation subsystem receiving a plurality of input signals; the acoustic echo-cancelation subsystem generating a plurality of output signals by subtracting an interference component from the input signals; an adaptive beamformer subsystem computing a signal-to-noise ratio (SNR) enhanced signal based at least in part on a plurality of output signals received from the acoustic echo-cancelation subsystem; a residual noise suppressor subsystem attenuating at least one portion of the SNR enhanced signal received from the acoustic echo-cancelation subsystem based on the at least one portion having an SNR below a predetermined SNR threshold; an automatic gain control (AGC) subsystem processing a signal outputted from the residual noise suppressor subsystem; and the AGC subsystem transmitting a resulting signal as an output signal.

Example 12 includes the method of Example 11, the method further comprising a user voice activity detection (UVAD) subsystem determining whether a user's speech is present and providing a control signal based on the determination.

Example 13 includes the method of Example 12, the method further comprising the adaptive beamformer subsystem computing the SNR-enhanced signal based at least in part on the control signal from the UVAD subsystem.

Example 14 includes the method of Example 12, the method further comprising the residual noise suppressor subsystem attenuating the SNR enhanced signal received from the acoustic echo-cancelation subsystem based at least in part on the control signal from the UVAD subsystem.

Example 15 includes the method of any of Examples 11-14, wherein the plurality of input signals includes a feedforward signal, a feedback signal, and a headphone audio signal.

Example 16 includes a headset comprising: one or more earphones including one or more sensing components; one or more voice microphones to record a voice signal for voice transmission; and a processor coupled to the earphones and the voice microphones, the processor configured to execute: an acoustic echo-cancelation subsystem to receive a plurality of input signals, subtract an interference component from the input signals, and provide a plurality of output signals; an adaptive beamformer subsystem to receive the plurality of output signals from the acoustic echo-cancelation subsystem and compute a signal-to-noise ratio (SNR) enhanced signal based on the received output signals; a residual noise suppressor subsystem to attenuate at least one portion of the SNR enhanced signal received from the adaptive beamformer subsystem based on the at least one portion having an SNR below a predetermined SNR threshold; and an automatic gain control (AGC) subsystem to process a signal outputted from the residual noise suppressor subsystem and transmit a resulting signal as an output signal.

Example 17 includes the headset of Example 16, wherein the processor is further configured to execute a user voice activity detection (UVAD) subsystem to determine whether a user's speech is present and provide a control signal based on the determination.

Example 18 includes the headset of any of Examples 16-17, wherein the plurality of input signals includes a headphone audio signal.

Example 19 includes the headset of any of Examples 16-18, wherein the plurality of input signals includes a feedforward signal and a feedback signal.

Example 20 includes the headset of any of Examples 16-19, wherein the AGC subsystem is configured to process the signal outputted from the residual noise suppressor subsystem by attenuating the signal outputted from the residual noise suppressor subsystem with a root mean square (RMS) envelope below a predetermined threshold.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated.

In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Although specific examples of the disclosure have been illustrated and described for purposes of illustration, it will be understood that various modifications may be made without departing from the spirit and scope of the disclosure. Accordingly, the disclosure should not be limited except as by the appended claims.

We claim:

1. A voice isolation system, comprising:
    at least one loudspeaker configured to provide audio corresponding to a headphone audio signal;
    a plurality of microphones configured to provide a plurality of input signals including a feedforward audio signal and a feedback audio signal;
    a circuit configured to generate a first covariance signal based on the feedback audio signal and to generate a second covariance signal based on the feedforward audio signal;
    an acoustic echo-cancelation subsystem configured to receive the plurality of input signals, subtract an audio interference component based on the first covariance signal and the second covariance signal from at least one of the plurality of input signals, and provide a plurality of output signals;
    an adaptive beamformer subsystem separate from a residual noise suppressor subsystem and configured to receive the plurality of output signals from the acoustic echo-cancelation subsystem and compute a signal-to-noise ratio (SNR) enhanced signal based on the received output signals, the residual noise suppressor subsystem being configured to attenuate at least one portion of the SNR enhanced signal received from the adaptive beamformer subsystem by attenuating the at least one portion of the SNR enhanced signal having an SNR below a predetermined SNR threshold; and
    an automatic gain control (AGC) subsystem configured to process a signal outputted from the residual noise suppressor subsystem and transmit a resulting signal as an output signal.

2. The voice isolation system of claim 1, further comprising a headphone configured to provide the headphone audio signal, the at least one loudspeaker being included in the headphone.

3. The voice isolation system of claim 1, wherein the plurality of microphones includes a feedforward microphone configured to provide the feedforward audio signal and a feedback microphone configured to provide the feedback audio signal.

4. The voice isolation system of claim 3, further comprising a filter coupled with each of the feedforward and feedback microphones, wherein each filter is derived from a real-time estimate of signal, interference, and noise spectra for the corresponding microphone.

5. The voice isolation system of claim 1, further comprising a user voice activity detection subsystem configured to determine whether a user's speech is present and provide a control signal based on the determination.

6. The voice isolation system of claim 5, wherein the residual noise suppressor subsystem is further configured to receive the control signal from the user voice activity detection subsystem and attenuate at least one portion of the SNR enhanced signal received from the adaptive beamformer subsystem based at least in part on the control signal.

7. The voice isolation system of claim 5, wherein the adaptive beamformer subsystem is further configured to receive the control signal from the user voice activity detection subsystem and compute the SNR-enhanced signal based at least in part on the control signal.

8. The voice isolation system of claim 1, wherein the AGC subsystem is configured to process the signal outputted from the residual noise suppressor subsystem by attenuating the signal outputted from the residual noise suppressor subsystem with a root mean square (RMS) envelope below a predetermined RMS threshold.

9. The voice isolation system of claim 1, wherein the acoustic echo-cancelation subsystem is configured to subtract the audio interference component from the feedforward audio signal.

10. A method for voice isolation, the method comprising:
receiving a plurality of input signals from a plurality of microphones including a feedforward audio signal and a feedback audio signal;
providing audio corresponding to a headphone audio signal via at least one loudspeaker;
generating a first covariance signal based on the feedback audio signal;
generating a second covariance signal based on the feedforward audio signal;
generating a plurality of output signals by subtracting an audio interference component based on the first covariance signal and the second covariance signal from at least one of the plurality of input signals;
computing a signal-to-noise ratio (SNR) enhanced signal based at least in part on a plurality of output signals;
attenuating at least one portion of the SNR enhanced signal by attenuating the at least one portion of the SNR enhanced signal having an SNR below a predetermined SNR threshold to provide a conditioned signal;
adjusting a gain of the conditioned signal; and
transmitting a resulting signal as an output signal.

11. The method of claim 10, further comprising determining whether a user's speech is present and providing a control signal based on the determination.

12. The method of claim 11, further comprising computing the SNR-enhanced signal based at least in part on the control signal.

13. The method of claim 11, further comprising attenuating the SNR enhanced signal based at least in part on the control signal.

14. The method of claim 10, wherein the at least one of the plurality of input signals is the feedforward audio signal.

15. The method of claim 10, wherein adjusting the gain of the conditional signal includes attenuating a portion of the conditional signal having a root mean square (RMS) envelope below a predetermined RMS threshold.

16. A headset, comprising:
one or more earphones including one or more sensing components and one or more loudspeakers;
a plurality of voice microphones configured to record a voice signal for voice transmission and provide a plurality of input signals including a feedforward audio signal and a feedback audio signal; and
at least one processor configured to calculate a first covariance signal based on the feedback audio signal, calculate a second covariance signal based on the feedforward audio signal, receive the plurality of input signals, subtract an audio interference component based on the first covariance signal and the second covariance signal from at least one of the plurality of input signals and provide a plurality of output signals, compute a signal-to-noise ratio (SNR) enhanced signal based on the plurality of output signals, attenuate at least one portion of the SNR enhanced signal by attenuating the at least one portion of the SNR enhanced signal having an SNR below a predetermined SNR threshold to provide a conditioned signal, adjust a gain of the conditioned signal, and transmit a resulting signal as an output signal.

17. The headset of claim 16, wherein the processor is further configured to determine whether a user's speech is present and provide a control signal based on the determination.

18. The headset of claim 16, wherein adjusting the gain of the conditioned signal includes attenuating the conditioned signal with a root mean square (RMS) envelope below a predetermined RMS threshold.

19. The headset of claim 16, wherein the at least one of the plurality of input signals is the feedforward audio signal.

* * * * *